(12) United States Patent
Yang et al.

(10) Patent No.: US 11,810,359 B2
(45) Date of Patent: Nov. 7, 2023

(54) VIDEO SEMANTIC SEGMENTATION METHOD BASED ON ACTIVE LEARNING

(71) Applicant: DALIAN UNIVERSITY OF TECHNOLOGY, Liaoning (CN)

(72) Inventors: Xin Yang, Liaoning (CN); Xiaopeng Wei, Liaoning (CN); Yu Qiao, Liaoning (CN); Qiang Zhang, Liaoning (CN); Baocai Yin, Liaoning (CN); Haiyin Piao, Liaoning (CN); Zhenjun Du, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 209 days.

(21) Appl. No.: 17/557,933

(22) Filed: Dec. 21, 2021

(65) Prior Publication Data
US 2022/0215662 A1   Jul. 7, 2022

(30) Foreign Application Priority Data

Jan. 6, 2021   (CN) .......................... 202110012126.0

(51) Int. Cl.
*G06V 10/00* (2022.01)
*G06V 20/40* (2022.01)
(Continued)

(52) U.S. Cl.
CPC ............ *G06V 20/49* (2022.01); *G06F 18/217* (2023.01); *G06F 18/2155* (2023.01);
(Continued)

(58) Field of Classification Search
CPC .......... G06N 3/08; G06N 3/088; G06N 3/045; G06V 10/82; G06V 10/72; G06V 10/776; G06V 10/764; G06V 10/46; G06V 10/7753; G06V 10/778; G06V 20/49; G06V 20/41; G06F 18/217; G06F 18/2155; G06T 3/4007; G06T 3/4046; G06T 9/002;
(Continued)

(56) References Cited

U.S. PATENT DOCUMENTS 10,430,946 B1 * 10/2019 Zhou ...................... G06N 3/047
10,453,200 B2 * 10/2019 Mukherjee ............. G06N 3/045
(Continued)

*Primary Examiner* — Amir Alavi
(74) *Attorney, Agent, or Firm* — MUNCY, GEISSLER, OLDS & LOWE, P.C.

(57) ABSTRACT

The present invention belongs to the technical field of computer vision, and provides a video semantic segmentation method based on active learning, comprising an image semantic segmentation module, a data selection module based on the active learning and a label propagation module. The image semantic segmentation module is responsible for segmenting image results and extracting high-level features required by the data selection module; the data selection module selects a data subset with rich information at an image level, and selects pixel blocks to be labeled at a pixel level; and the label propagation module realizes migration from image to video tasks and completes the segmentation result of a video quickly to obtain weakly-supervised data. The present invention can rapidly generate weakly-supervised data sets, reduce the cost of manufacture of the data and optimize the performance of a semantic segmentation network.

1 Claim, 1 Drawing Sheet

(51) Int. Cl.

| | |
|---|---|
| *G06V 10/46* | (2022.01) |
| *G06V 10/82* | (2022.01) |
| *G06T 3/40* | (2006.01) |
| *G06T 7/215* | (2017.01) |
| *G06T 9/00* | (2006.01) |
| *G06V 10/72* | (2022.01) |
| *G06V 10/764* | (2022.01) |
| *G06V 10/778* | (2022.01) |
| *G06V 10/774* | (2022.01) |
| *G06V 10/776* | (2022.01) |
| *G06T 7/10* | (2017.01) |
| *G06F 18/21* | (2023.01) |
| *G06F 18/214* | (2023.01) |

(52) U.S. Cl.
CPC .......... *G06T 3/4007* (2013.01); *G06T 3/4046* (2013.01); *G06T 7/10* (2017.01); *G06T 7/215* (2017.01); *G06T 9/002* (2013.01); *G06V 10/46* (2022.01); *G06V 10/72* (2022.01); *G06V 10/764* (2022.01); *G06V 10/776* (2022.01); *G06V 10/778* (2022.01); *G06V 10/7753* (2022.01); *G06V 10/82* (2022.01); *G06V 20/41* (2022.01); *G06T 2207/10016* (2013.01); *G06T 2207/10024* (2013.01); *G06T 2207/20081* (2013.01); *G06T 2207/20084* (2013.01)

(58) Field of Classification Search
CPC . G06T 2207/10016; G06T 2207/10024; G06T 2207/20081; G06T 2207/20084; G06K 9/6262; G06K 9/6259
See application file for complete search history.

(56) References Cited

U.S. PATENT DOCUMENTS

| | | | | |
|---|---|---|---|---|
| 10,467,500 | B1* | 11/2019 | Bao | G06T 7/10 |
| 10,740,897 | B2* | 8/2020 | Chen | G06F 18/24143 |
| 11,151,721 | B2* | 10/2021 | Avendi | G06T 7/11 |
| 11,182,620 | B2* | 11/2021 | Weinzaepfel | G06N 3/045 |
| 11,256,960 | B2* | 2/2022 | Lee | G06N 3/08 |
| 11,562,489 | B2* | 1/2023 | Ramani | G06V 40/107 |
| 11,613,201 | B2* | 3/2023 | Li | G06V 20/56 |
| | | | | 315/82 |
| 11,676,278 | B2* | 6/2023 | Rhodes | G06T 7/11 |
| | | | | 382/103 |
| 2019/0051056 | A1* | 2/2019 | Chiu | G06F 16/903 |
| 2022/0215662 | A1* | 7/2022 | Yang | G06F 18/2155 |

\* cited by examiner

VIDEO SEMANTIC SEGMENTATION METHOD BASED ON ACTIVE LEARNING

TECHNICAL FIELD

The present invention belongs to the technical field of computer vision, and particularly relates to an image semantic segmentation technology based on deep learning, which uses the idea and method of active learning to minimize data labeling on the premise of ensuring high segmentation accuracy with respect to the problem of difficulty in annotating video semantic segmentation datasets.

BACKGROUND

The video semantic segmentation technology is an important research topic in computer vision, and aims to predict the category of each pixel in an image by providing the RGB images of a video as input, so as to segment the specific location of each category object on the images. Convolutional neural networks (CNNs), which are popular at present, are widely used in semantic segmentation tasks because of the powerful feature extraction ability. Semantic segmentation can aggregate the pixels belonging to the same part in the RGB images, and can well solve some scenario understanding problems. The common application fields of semantic segmentation mainly include automatic driving and medical treatment, with high research value.

In terms of semantic segmentation, it is necessary to train the network through input data to achieve high accuracy segmentation effect. In the process of training the CNNs, to improve the segmentation effect of the network, a large number of high-quality semantic segmentation data sets are also very important factors in addition to well-designed network structures and modules. The CNNs need to be supported by a large amount of data, so as to achieve better generalization. Nowadays, in the field of semantic segmentation, many high-accuracy indoor or outdoor video segmentation datasets also appear, which provide great help to the field of segmentation, so that the effects of different CNNs on the segmentation are greatly improved. However, due to the rapid development of the field of deep learning in recent years, the problem of serious lack of data sets appears in many fields of computer vision. Although high-quality datasets are constantly expanded, they are still far behind the growth rate of the number of neural network frameworks.

With respect to the problem of the lack of data, active learning comes into view again. By using the active learning method, a data subset that has the greatest influence on the neural network effect can be found from a large amount of unlabeled data. The selected subset is labeled and feed into the CNN for training, so that the network can achieve high segmentation effect. The method aims to provide minimum labeled data, so that the CNN can achieve the original effect obtained by inputting all the datasets into the network. Therefore, through the combination of the active learning and the deep learning, the problem of lack of data in the field of semantic segmentation can be well solved, and the segmentation accuracy of the network is ensured, thereby providing more potential possibilities for the progress of the semantic segmentation technology. The related technical background of the above fields will be introduced below in detail.

(1) Semantic Segmentation

In the early field of image segmentation, due to the limited performance of the computer, the segmentation technology at that time can only process some gray scale images and extract some low-level eigenvalues. With the rapid development of the theoretical knowledge of machine learning and deep learning and the appearance of high-performance hardware, the semantic segmentation technology based on the deep learning is continuously updated and iterated. The neural network can be used to establish mapping of pixel-level classification of input and output of RGB images on the semantic segmentation tasks.

At an initial stage in which the deep learning is applied to the field of computer vision, Long et al. proposed the fully convolutional network (FCN). Under segmentation of the FCN, not only the segmentation can be conducted on the RGB images according to the categories of objects, but also the information of segmented objects can be obviously seen from the segmentation result. At present, most of semantic segmentation networks based on the deep learning are adjusted and modified on the basis of the FCN, and the FCN is considered as a milestone in the field of semantic segmentation. Subsequently, to expand the receptive field of the neural network, Chen et al. proposed the conditional random field (CRF), and Yu et al. proposed the concept of multi-scale atrous convolution. The CRF refines the segmentation result through post-processing, while the multi-scale atrous convolution improves the segmentation performance through the combination of high-level features and low-level features. Then, PSPNet proposed a pyramid network structure, which obtains more context information in the images through pooling layers of different scales and connects the information together to improve the segmentation result. With the continuous improvement and development of extended convolutional technology, the current popular Deeplabv3 has started to appear. The network structure adopts atrous convolution ASPP structure, also deepens the number of convolution layers, further improves the accuracy of semantic segmentation, and becomes a currently common semantic segmentation framework.

(2) Active Learning

The semantic segmentation technologies based on the deep learning rely on a large amount of data to achieve good generalization, so as to perform high-accuracy segmentation tasks on other unlabeled RGB images. In real data analysis scenarios, many required RGB images can be obtained through a camera or camcorder. However, these data are unlabeled data, cannot provide a favorable supervised learning for the neural network, and thus cannot be directly used for the neural network. Although the data can become a training set of the network through manual labeling, because the semantic segmentation tasks are classification tasks based on the pixel level, labeling by people may consume a lot of manpower and time, and the cost of money and time consumed by making the data set is huge.

The active learning can actively propose some labeling requests and submit some selected data to experts (labeling persons) for labeling. The workload of manual labeling can be greatly reduced through such the selection operation. Nowadays, common uncertainty methods are widely used with deep learning and have achieved good effects. Frequently-used strategies of least confidence, cross entropy and vote entropy have better effects than random sample selection strategies, which indicate the reliability of active learning strategies. However, for the multi-classification pixel-level semantic segmentation tasks, these methods cannot be well migrated to the semantic segmentation tasks due to the own limitations.

SUMMARY

The present invention designs a multi-level (image-level and pixel-level) data selection algorithm based on an active learning method with respect to the technical problems of lack of video semantic segmentation datasets, difficult making, high cost and poor performance of traditional active learning strategies in semantic segmentation tasks. In combination with the existing image semantic segmentation network, training convergence of the network can be accelerated and data dependence can be reduced. In addition, in combination with an optical flow estimation algorithm, migration from images to video tasks can be realized, a large number of weakly-supervised data can be generated quickly, and the lack of video semantic segmentation data sets can be alleviated.

The technical solution of the present invention is as follows:

A video semantic segmentation method based on active learning, comprising an image semantic segmentation module, a data selection module based on the active learning and a label propagation module; the image semantic segmentation module is responsible for segmenting image results and extracting high-level features required by the data selection module; the data selection module selects a data subset with rich information at an image level, and selects pixel blocks to be labeled at a pixel level; the label propagation module realizes migration from image to video tasks and completes the segmentation result of a video quickly to obtain weakly-supervised data.

(1) Image Semantic Segmentation Module

The image semantic segmentation module is composed of an improved full convolutional network; a main network structure adopts Mobilenet v2 structure to extract the features of RGB images; After obtaining high-level feature information, a decoder converts the number of feature channels into the number of categories to achieve the effect of pixel classification; and finally, a semantic label image with classification information of the same size as the RGB images is obtained by upsampling.

(1.1) Input of the Image Semantic Segmentation Module:

Generally, an image semantic segmentation network has no size limit on the input RGB images, but in the present invention, a selection strategy at the pixel level needs to fix the size of the images, so the input training data needs to be resized. The input training data is divided into two parts: one part comprises the RGB images (denoted as x), and the other part comprises corresponding semantic labels (denoted as y). The input data is adjusted in the following way:

$$X=B(x) \tag{1}$$

$$Y=N(y) \tag{2}$$

wherein B(x) represents that the RGB images are processed by bilinear interpolation, and N(y) represents that the semantic labels are processed by nearest neighbor interpolation.

(1.2) Feature Extraction Encoder Module:

The RGB images are feed into the network; firstly, the number of the channels is converted from 3 channels to 32 channels through an initial convolution layer of which the feature is denoted as $F_{init}$. Then, a high-level feature with length and width of 16 and 32 is obtained by seven residual convolutions; Bottleneck residual blocks of Mobilenetv2 are used in the present invention, and the final number of the channels is 320; therefore, the level of the high-level feature (HLF) is 16×32×320. The sum of the input and the features that pass through the first 3 Bottleneck residue blocks is used as a low-level feature (LLF). LLF can be expressed as:

$$LLF=[F_{init},BN\_1(x),BN\_2(x),BN\_3(x)] \tag{3}$$

wherein $BN\_1(x), BN\_2(x)$ and $BN\_3(x)$ represent the features that pass through the first 3 residue blocks respectively. [ ] is concatenation operation.

(1.3) Decoder Module:

The above high-level feature HLF is sampled by atrous convolution with different sampling rates through an atrous spatial convolution pooling pyramid (ASPP); the sampled feature is fused with the low-level feature LLF and input into the decoder module for decoding the number of the channels, and finally the channel size of the corresponding object category number in the image is obtained. The whole process is described as follows:

$$F_{decode}=DEC(F_{ASPP},LLF) \tag{4}$$

where $F_{ASPP}$ is the associative feature output by the ASPP. DEC represents the decoder module designed by the present invention; $F_{ASPP}$ passes through the convolution layer to make the level the same as the feature level in the LLF; the two levels are concatenated in the channel level and pass through a deconvolution layer to obtain $F_{decode}$. $F_{decode}$ is obtained and then input into a bilinear upsampling layer, so that the feature is converted to the same size as the original RGB image; each pixel on the image corresponds to a predicted category result $F_{class}$. A framework of a semantic segmentation network is shown in FIG. 2.

(2) Data Selection Module Based on the Active Learning (2.1) Image-Level Data Selection Module:

After the RGB image passes through the image semantic segmentation module, a final predicted result $F_{class}$ is obtained, and a middle feature $F_{decode}$ extracted from an encoder by the present invention is used as the input of the data selection module. $F_{decode}$ is input into a designed fitting scoring network; firstly, a convolution kernel is used as the input feature for level reduction operation of a global pooling layer of the last two levels to obtain a vector $V_{class}$ with the same size as the number of categories. $V_{class}$ is feed into three full connection layers (FC), and the number of the channels is decreased successively from the number of the categories, 16, 8 and 1 to finally obtain a value S. The closer S is to 0, the better the performance of the selected image in the semantic segmentation module is; otherwise, the effect is worse.

The formula to calculate the loss by the semantic segmentation network in a training process adopts a cross entropy function, and the function is expressed as formula (5):

$$L_{seg}=-\Sigma_{c=1}^{M}y_c \log(p_c) \tag{5}$$

wherein M represents the number of the categories; $y_c$ represents category judgment of variables, which is 1 for the same categories and 0 for different categories; $p_c$ represents a predicted probability that an observed sample belongs to category c. After $V_{class}$ is obtained by the selection module based on the active learning, the MSE loss function of the following formula (7) is designed to improve the performance of the selection module:

$$L_{pre}=(L_{seg}-V_{class})^2 \tag{6}$$

wherein $L_{seg}$ is loss obtained during the training of the semantic segmentation module, and $V_{class}$ is a value obtained by the selection module; a gap between the two is reduced by constant iterative optimization of an optimizer to achieve the purpose of selection and optimization of the selection module. The overall optimization process is shown in FIG. 2. The overall loss function is expressed by the formula (7):

$$L_{total}=L_{seg}+\lambda L_{pre} \tag{7}$$

wherein λ is a hyper parameter used to control the proportion of $L_{pre}$ in the whole loss, and the value of λ generally ranges from 0 to 1. After the training, fixed parameters can be predicted on unlabeled data, and each image obtains a corresponding $L_{pre}$; and $L_{pre}$ is sequenced to select the first N images with maximum values as data subsets to be labeled in the next round.

(2.2) Pixel-Level Data Selection Module:

After passing the image-level data selection module, some data subsets to be labeled are selected. In order to further reduce the workload of labeling and consider the difference of proportions of each category in the image, the information on many pixels is repeated, so the pixel-level data selection module is proposed. The selected data subsets are feed to obtain the distribution of information entropy on each image. The information entropy is calculated by vote entropy, which is improved on the basis of formula (5) and expressed as follows:

$$S_{ve} = \frac{1}{D}\Sigma_{d=1}^{D} L_{seg} \qquad (8)$$

wherein D represents the frequency of votes and D is set as 20 in the present invention. Then, a pixel window of 16*16 size is used to slide on the image to calculate the information in each pixel window; and finally, the pixel windows with most information are selected through sequencing. The module further reduces the labeling from the whole image to the scope labeling.

(3) Label Propagation Module

In order to realize rapid acquisition of labeled data sets for video semantic segmentation, most of the data exists in the form of videos in the process of data collection. Considering that the video is made up of an ordered set of images, i.e., frames, the difference between a previous frame and a next frame is slight and the similarity is great. After the previous image selection step is completed, for example, the data selection module selects a frame t and can obtain a moving distance (δx, δy) of each pixel between the frame t and a frame t+1 through optical flow (OF) estimation, specifically described as follows:

$$p_{(\delta x, \delta y)} = OF(t, t+1) \qquad (9)$$

wherein $p_{(\delta x, \delta y)}$ is the moving distance of the pixel. In the present invention, the existing FlowNetS is used as a propagation module to estimate the moving distance of the pixel. After the moving distance $p_{(\delta x, \delta y)}$ of the pixel is obtained, the semantic segmentation label of the frame t is input, to correspond to each pixel, to obtain the semantic segmentation result of the frame t+1. The whole process is described as follows:

$$G_{t+1} = warp(G_t, p_{(\delta x, \delta y)}) \qquad (10)$$

wherein warp is a pixel wrapping function, that is, pixels corresponding to $G_t$ on the RGB images are superimposed in x and y directions. The overall realization process of video semantic segmentation is shown in FIG. 1.

The present invention has the following beneficial effects:

The present invention proposes a video semantic segmentation method based on active learning. The method uses lightweight MobileNetv2 on the image segmentation module, which greatly improves the segmentation speed. Due to the lack of high-accuracy labels, a large amount of data cannot be used for neural networks for supervised training. The present invention proposes a matcher network based on active learning, which only inputs the RGB images and extracts rich information and features in the images. The loss of each image is obtained through the matcher network, so as to select data subsets to be labeled through the loss sizes of the images; and the pixel selection module can be used for further selection. On the one hand, manpower and time cost for making segmentation datasets are greatly reduced; and on the other hand, the selected data subsets comprise richer category information and details, which can accelerate the convergence of the semantic segmentation network. The present invention can rapidly generate the weakly-supervised datasets, reduce the cost of manufacture of the data and optimize the performance of the semantic segmentation network.

DETAILED DESCRIPTION

The present invention is further described below in detail in combination with specific embodiments. However, the present invention is not limited to the following embodiments.

(1) Training Datasets

The data sets used in the present invention need to satisfy the following requirements: firstly, the pixel sizes of the RGB images in the datasets used in the present invention shall be unified (1024×2048); and the present invention has an image resizing module so that the images with the pixel sizes of more than 512×1024 can be resized to 512×1024. If other data sets smaller than the standard, pooling layer parameters in the matcher network in codes shall be modified. Secondly, the used data sets need to have a small number of semantic segmentation labels corresponding to the RGB images as initialized training subsets for the whole network to adapt to new data sets.

(2) Network Training

Firstly, the initialized training subsets in the data sets, that is, a small amount of labeled data, are input; and the semantic segmentation module and the selection module based on the active learning calculate the loss function according to formula (8), train the whole network with a stochastic gradient descent algorithm (SGD) and optimize the loss. The batch processing size is set as 4; the initialized training data subsets are set as 20 labeled images; the number of selection rounds is set as 10; the data size N of each selection is 120; and the number of training rounds after each selection is 50. The learning rate of all convolution layers is set as 0.0004, and a learning rate strategy adopts a stepping strategy (after 35 rounds, the learning rate is multiplied by 0.1). The hyper parameter X in the loss is set as 0.1, and is verified every 5 rounds on a verification set in the training process.

(3) Network Test

Figure 1:
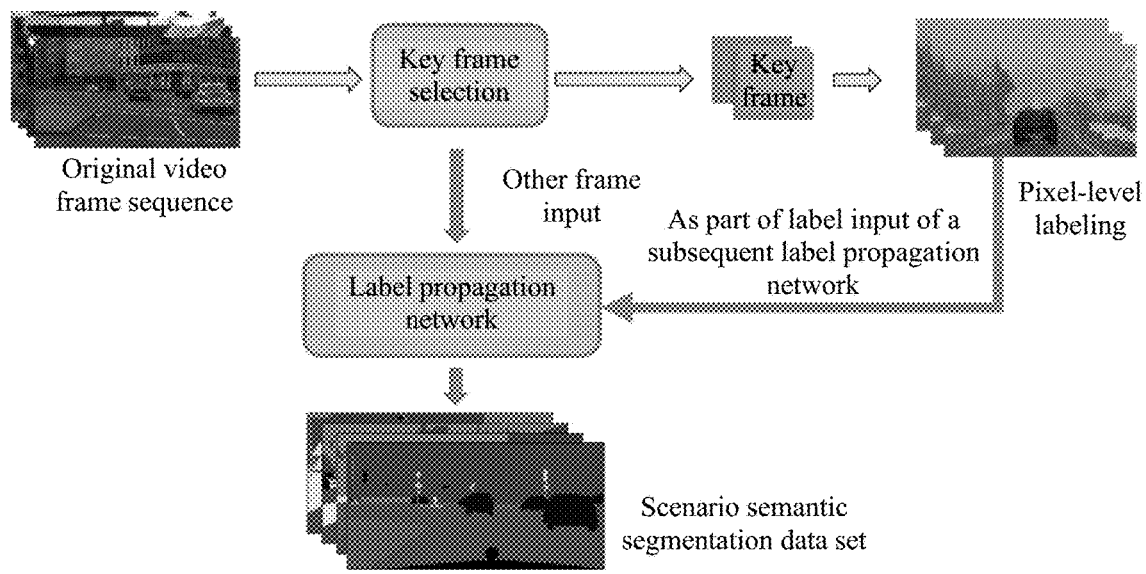
FIG. 1 is a diagram of a realization idea of a semantic segmentation technology based on active learning for a video scenario.
Figure 2:
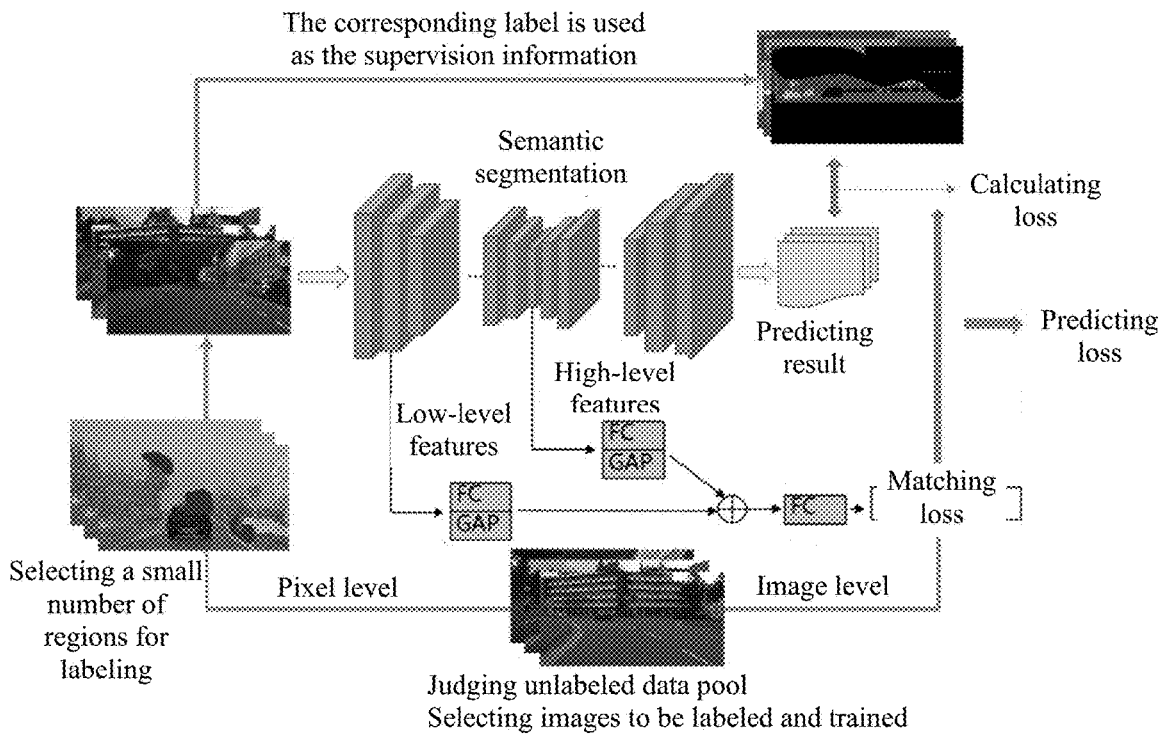
FIG. 2 is a network architecture diagram of active learning in the present invention. Two modules are included: a semantic segmentation encoder and decoder module and a matcher network selection module based on active learning strategy. The overall framework process forms a loop structure, which can continuously optimize the segmentation performance and selection accuracy.

In the process of a segmentation test, each test video sequence is firstly input into the semantic segmentation method based on the active learning. As shown in FIG. 2, the branch of training loss is closed and only the data selection module is used to select key video frames. For the data subsets (key frames) obtained after the selection, labels can be given manually or automatically segmented by the semantic segmentation module. The choice of the two modes depends on the requirements for accuracy and operating speed. After the labels of the key frames are obtained, the labels correspond to the RGB images of the key frames one by one, and a text of a file path of the images of the key frames is generated through a script. The text is input into optical flow estimation codes, so that automatic label propagation is conducted on other unlabeled images, and finally the whole test video sequence is segmented.

The invention claimed is:

1. A video semantic segmentation method based on active learning, comprising an image semantic segmentation module, a data selection module based on the active learning and a label propagation module; wherein the image semantic segmentation module is responsible for segmenting image results and extracting high-level features required by the data selection module based on active learning; the data selection module based on active learning selects a data subset with rich information at an image level, and selects pixel blocks to be labeled at a pixel level; the label propagation module realizes migration from image to video tasks and completes the segmentation result of a video quickly to obtain weakly-supervised data;

(1) Image Semantic Segmentation Module the image semantic segmentation module is composed of an improved full convolutional network; a backbone network architecture adopts Mobilenet v2 structure to extract the features of RGB images; After obtaining high-level feature information, a decoder converts the number of feature channels into the number of categories to achieve the effect of pixel classification; and finally, a semantic label image with classification information of the same size as the RGB images is obtained by upsampling;

(1.1) Input of the Image Semantic Segmentation Module:

a semantic segmentation network has no size limit on the input RGB images, and a selection strategy at the pixel level needs to fix the size of the images, so the input training data is resized; the input training data is divided into two parts: one part comprises the RGB images denoted as x, and the other part comprises corresponding semantic labels denoted as y; the input data is adjusted in the following way:

$$X=B(x) \qquad (1)$$

$$Y=N(y) \qquad (2)$$

wherein B(x) represents that the RGB images are processed by bilinear interpolation, and N(y) represents that the semantic labels are processed by nearest neighbor interpolation;

(1.2) Feature Extraction Encoder Module:

the RGB images are feed into the semantic segmentation network; firstly, the number of the channels is converted from 3 channels to 32 channels through an initial convolution layer of which the feature is denoted as $F_{init}$; then, a high-level feature with length and width of 16 and 32 is obtained by seven residual convolutions; Bottleneck residual blocks of Mobilenetv2 are used, and the final number of the channels is 320; therefore, the level of the high-level feature (HLF) is 16×32×320; the sum of the input and the features that pass through the first 3 Bottleneck residue blocks is used as a low-level feature (LLF); LLF is expressed as:

$$LLF=[F_{init},BN\_1(x),BN\_2(x),BN\_3(x)] \qquad (3)$$

wherein $BN\_1(x)$, $BN\_2(x)$ and $BN\_3(x)$ represent the features that pass through the first 3 residue blocks respectively; [ ] is concatenation operation;

(1.3) Decoder Module:

the above high-level feature HLF is sampled by atrous convolution with different sampling rates through an atrous spatial convolution pooling pyramid (ASPP); the sampled feature is fused with the low-level feature LLF and input into the decoder module for decoding the number of the channels, and finally the channel size of the corresponding object category number in the image is obtained; the whole process is described as follows:

$$F_{decode}=DEC(F_{ASPP},LLF) \qquad (4)$$

where $F_{ASPP}$ is the associative feature output by the ASPP; DEC represents the decoder module designed by the method; $F_{ASPP}$ passes through the convolution layer to make the level the same as the feature level in the LLF; the two levels are concatenated in the channel level and pass through a deconvolution layer to obtain $F_{decode}$; $F_{decode}$ is obtained and then input into a bilinear upsampling layer, so that the feature is converted to the same size as the original RGB image; each pixel on the image corresponds to a predicted category result $F_{class}$;

(2) Data Selection Module Based on the Active Learning (2.1) Image-Level Data Selection Module:

after the RGB image passes through the image semantic segmentation module, a final predicted result $F_{class}$ is obtained, and a middle feature $F_{decode}$ extracted from an encoder module by the method is used as the input of the image-level data selection module; $F_{decode}$ is input into a designed matcher rating network; firstly, a convolution kernel is used as the input feature for level reduction operation of a global pooling layer of the last two levels to obtain a vector $V_{class}$ with the same size as the number of categories; $V_{class}$ is feed into three full connection layers, and the number of the channels is decreased successively from the number of the categories, 16, 8 and 1 to finally obtain a value S; the closer S is to 0, the better the performance of the selected image in the image semantic segmentation module is; otherwise, the effect is worse;

the formula to calculate the loss by the image semantic segmentation network in a training process adopts a cross entropy function, and the function is expressed as formula (5):

$$L_{seg}=-\Sigma_{c=1}^{M}y_c \log(p_c) \qquad (5)$$

wherein M represents the number of the categories; $y_c$ represents category judgment of variables, which is 1 for the same categories and 0 for different categories; $p_c$ represents a predicted probability that an observed sample belongs to category c; after $V_{class}$ is obtained by the data selection module based on the active learning, the MSE loss function of the following formula (7) is designed to improve the performance of the selection module:

$$L_{pre}=(L_{seg}-V_{class})^2 \qquad (6)$$

wherein $L_{seg}$ is loss obtained during the training of the image semantic segmentation module, and $V_{class}$ is a value obtained by the selection module; a gap between the two is reduced by constant iterative optimization of an optimizer to achieve the purpose of selection and optimization of the selection module; the overall loss function is expressed by the formula (7):

$$L_{total} = L_{seg} + \lambda L_{pre} \qquad (7)$$

wherein $\lambda$ is a hyper parameter used to control the proportion of $L_{pre}$ in the whole loss, and the value of $\lambda$ ranges from 0 to 1; after the training, fixed parameters are predicted on unlabeled data, and each image obtains a corresponding $L_{pre}$; $L_{pre}$ is sequenced to select the first N images with maximum values as data subsets to be labeled in the next round;

(2.2) Pixel-Level Data Selection Module:

after passing the image-level data selection module, some data subsets to be labeled are selected; the selected data subsets are feed to obtain the distribution of information entropy on each image; the information entropy is calculated by vote entropy, which is improved on the basis of formula (5) and expressed as follows:

$$S_{ve} = \frac{1}{D} \Sigma_{d=1}^{D} L_{seg} \qquad (8)$$

wherein D represents the frequency of votes and D is set as 20; then, a pixel window of 16*16 size is used to slide on the image to calculate the information in each pixel window; and finally, the pixel windows with most information are selected through sequencing;

(3) Label Propagation Module the data selection module based on the active learning selects a frame t and obtains a moving distance ($\delta x$, $\delta y$) of each pixel between the frame t and a frame t+1 through optical flow estimation, described as follows:

$$p_{(\delta x, \delta y)} = OF(t, t+1) \qquad (9)$$

wherein $p_{(\delta x, \delta y)}$ is the moving distance of the pixel; in the method, the existing FlowNetS is used as a propagation module to estimate the moving distance of the pixel; after the moving distance $p_{(\delta x, \delta y)}$ of the pixel is obtained, the semantic segmentation label of the frame t is input, to correspond to each pixel, to obtain the semantic segmentation result of the frame t+1; the whole process is described as follows:

$$G_{t+1} = \text{warp}(G_t, p_{(\delta x, \delta y)}) \qquad (10)$$

wherein warp is a pixel wrapping function, that is, pixels corresponding to $G_t$ on the RGB images are superimposed in x and y directions.

* * * * *